(12) United States Patent
Soukharev et al.

(10) Patent No.: US 11,128,434 B2
(45) Date of Patent: Sep. 21, 2021

(54) ELLIPTIC CURVE CRYPTOGRAPHY SCHEME WITH SIMPLE SIDE-CHANNEL ATTACK COUNTERMEASURE

(71) Applicant: INFOSEC GLOBAL INC., Toronto (CA)

(72) Inventors: Vladimir Soukharev, Toronto (CA); Basil Hess, Zurich (CH)

(73) Assignee: INFOSEC GLOBAL INC., Toronto (CA)

( * ) Notice: Subject to any disclaimer, the term of this patent is extended or adjusted under 35 U.S.C. 154(b) by 24 days.

(21) Appl. No.: 16/539,643

(22) Filed: Aug. 13, 2019

(65) Prior Publication Data

US 2020/0044817 A1 Feb. 6, 2020

Related U.S. Application Data

(63) Continuation of application No. PCT/CA2017/050173, filed on Feb. 13, 2017.

(51) Int. Cl.
*H04L 9/00* (2006.01)
*H04L 9/30* (2006.01)
*H04L 29/06* (2006.01)

(52) U.S. Cl.
CPC .............. *H04L 9/003* (2013.01); *H04L 9/00* (2013.01); *H04L 9/30* (2013.01); *H04L 9/3066* (2013.01); *H04L 63/00* (2013.01); *H04L 63/0442* (2013.01); *H04L 63/06* (2013.01); *G06F 2211/008* (2013.01); *H04L 2209/08* (2013.01); *H04L 2209/12* (2013.01)

(58) Field of Classification Search
CPC ... H04L 9/003; H04L 9/00; H04L 9/30; H04L 9/3066; H04L 63/00; H04L 63/0442; H04L 63/06; H04L 2209/08; H04L 2209/12; G06F 2211/008
See application file for complete search history.

(56) References Cited

U.S. PATENT DOCUMENTS

2008/0019509 A1* 1/2008 Al-Gahtani ............ H04L 9/003
380/30
2009/0113252 A1* 4/2009 Lambert ................ G06F 7/725
714/48

(Continued)

OTHER PUBLICATIONS

Chabrier, "Arithmetic Recodings for ECC Cryptoprocessors with Protections against Side-Channel Attacks", PhD dissertation, Université de Rennes 1, Jun. 18, 2013 (Year: 2013).*

*Primary Examiner* — Jung W Kim
*Assistant Examiner* — Howard H. Louie
(74) *Attorney, Agent, or Firm* — Bhole IP Law; Anil Bhole; Marc Lampert

(57) ABSTRACT

There is provided an elliptic curve cryptographic scheme for permitting secure communications between two or more cryptographic correspondent devices, with a simple side-channel attack countermeasure. The cryptographic scheme includes: transforming a point to Jacobian projective coordinates; constant-time scalar multiplication of the point by a parameter; and transforming the resultant of the scalar multiplication to affine coordinates. The scalar multiplication including: performing iteratively to the value of the parameter either one of: doubling of the point and multiplying any two random field elements; or mixed addition of the point.

12 Claims, 6 Drawing Sheets

(56) References Cited

U.S. PATENT DOCUMENTS

| | | | |
|---|---|---|---|
| 2009/0214025 A1* | 8/2009 | Golic | G06F 7/725 380/28 |
| 2016/0087802 A1* | 3/2016 | Peeters | H04L 9/003 713/176 |
| 2018/0227115 A1* | 8/2018 | Ghosh | H04L 9/002 |

* cited by examiner

ELLIPTIC CURVE CRYPTOGRAPHY SCHEME WITH SIMPLE SIDE-CHANNEL ATTACK COUNTERMEASURE

TECHNICAL FIELD

The following relates to data communication systems and cryptographic schemes utilized in such systems; and more specifically, to a simple side-channel attack countermeasure for elliptic curve cryptography.

BACKGROUND

Elliptic curve-based cryptographic ("ECC") schemes generally use cryptographic approaches that have been heavily scrutinized to avoid attacks on the scheme itself. However, there exist other types of attacks that target a physical implementation of a cryptosystem, emissions of the implementation, or the like. These types of attacks are generally referred to as side-channel attacks ("SCA"). In some cases, side-channels can include power consumption, timing, and emissions such as radio frequency ("RF"), sound, or the like.

In general, SCAs can be either simple side-channel attacks ("Simple SCA" or "SSCA") or differential side-channel attacks ("Differential SCA" or "DSCA").

Simple SCA can typically obtain information about the system from observed operations, usually single observed operations. In the case of ECC, such single operation can be a single scalar multiplication (i.e., the operation d·P). The security of ECC schemes is based on the hardness of the elliptic curve discrete logarithm problem ("ECDLP"); for a point P (of order n) on the elliptic curve and a random secret value $d \in \{1, \ldots, n-1\}$, it is hard to derive the discrete logarithm d from Q=d·P. Simple SCA typically exploit timing or power consumption characteristics of the scalar multiplication algorithm (for example, of the double-and-add scalar multiplication approach) that depend on the secret scalar d.

Generally, differential SCA are attempted if the attacker cannot derive sufficient information from a simple SCA. Differential SCAs typically can be attempted if side-channel information of operations, with the same secret scalar element and different group elements (for example, elliptic curve points) are available. Exploits typically employ statistical analysis to derive information about the secret scalar d. Differential SCA may also be known as Differential Power Analysis Attacks.

However, conventional approaches to countermeasures to SSCA are typically not sufficiently optimized or efficient, and as such, detriment the performance of a system employing the ECC.

It is therefore an object of the present invention to provide an elliptic curve cryptographic scheme in which the above disadvantages are obviated or mitigated and attainment of the desirable attributes is facilitated.

SUMMARY

In an aspect, there is provided an elliptic curve cryptography scheme resistant to simple side channel attacks for permitting secure communications between two or more cryptographic correspondent devices, each of the cryptographic correspondent devices comprising a processor and a memory, the memory configured to store a plurality of instructions which when executed by the processor cause the processor to implement the cryptographic scheme, the cryptographic scheme comprising: generating a Jacobian projective coordinate representation of a point; scalar multiplication of the point by a parameter, the scalar multiplication comprising: performing iteratively in relation to the value of the parameter, for each iteration, either one of: doubling of the point and performing a dummy operation; or mixed addition of the point; and transforming the resultant of the scalar multiplication to affine coordinates.

In another case, the dummy operation has a computational cost of one operation.

In yet another case, the dummy operation comprises multiplying two field elements of the elliptic curve.

In yet another case, the field elements are any two random field elements.

In yet another case, the point is a generator point of the elliptic curve.

In another aspect, there is provided a method for a simple side-channel attack countermeasure for scalar multiplication of a point by a parameter in an elliptic curve cryptographic scheme, the elliptic curve cryptographic scheme permitting secure communications between two or more cryptographic correspondent devices, each of the cryptographic correspondent devices having a processor and a memory, the memory configured to store a plurality of instructions which when executed by the processor cause the processor to implement the cryptographic scheme, the method comprising: generating a Jacobian projective coordinate representation of the point; performing iteratively in relation to the value of the parameter, for each iteration, either one of: if doubling of the point is viable: doubling of the point to produce a new value for the point; and performing a dummy operation; or if doubling of the point is not viable, performing mixed addition on the point to produce a new value for the point; and transforming the point to affine coordinates.

In another case, the dummy operation has a computational cost of one operation.

In yet another case, the dummy operation comprises multiplying two field elements of the elliptic curve.

In yet another case, the field elements are any two random field elements.

In yet another case, the point is a generator point of the elliptic curve.

In yet another case, doubling the point is viable if the value of a corresponding bit of the scalar is zero.

In yet another case, mixed addition on the point comprises performing addition on the value of the point at a particular iteration, in Jacobian projective coordinates, with the original value of the point, in affine coordinates, to produce the new value of the point in Jacobian projective coordinates.

In yet another aspect, there is provided a system for implementing an elliptic curve cryptographic scheme on a correspondent device, the elliptic curve cryptographic scheme having a countermeasure resistant to a simple side-channel attack, the elliptic curve cryptographic scheme permitting secure communications between two or more cryptographic correspondent devices, each of the cryptographic correspondent devices comprising a processor and a memory, the memory configured to store a plurality of instructions which when executed by the processor cause the processor to implement the cryptographic scheme, the elliptic curve cryptographic scheme comprising scalar multiplication of a point by a parameter, the system comprising: a representation generation module for generating a Jacobian projective coordinate representation of the point; a determination module for performing iteratively in relation to the value of the parameter, for each iteration, either one of: if doubling of the point is viable: doubling of the point to produce a new value for the point; and performing a dummy operation; or if doubling of the point is not viable, performing mixed addition on the point to produce a new value for the point; and a transformation module for transforming the point to affine coordinates.

In another case, the dummy operation has a computational cost of one operation.

In yet another case, the dummy operation comprises the determination module multiplying two field elements of the elliptic curve.

In yet another case, the field elements are any two random field elements.

In yet another case, the point is a generator point of the elliptic curve.

In yet another case, the determination module determines if doubling the point is viable by determining if the value of a corresponding bit of the scalar is zero.

In yet another case, mixed addition on the point comprises the determination module performing addition on the value of the point at a particular iteration, in Jacobian projective coordinates, with the original value of the point, in affine coordinates, to produce the new value of the point in Jacobian projective coordinates.

These and other embodiments are contemplated and described herein. It will be appreciated that the foregoing summary sets out representative aspects of embodiments for an elliptic curve cryptography scheme with a simple side-channel attack countermeasure to assist skilled readers in understanding the following detailed description.

DESCRIPTION OF THE DRAWINGS

An embodiment of the present invention will now be described by way of example only with reference to the accompanying drawings, in which.

DETAILED DESCRIPTION

Figure 1:
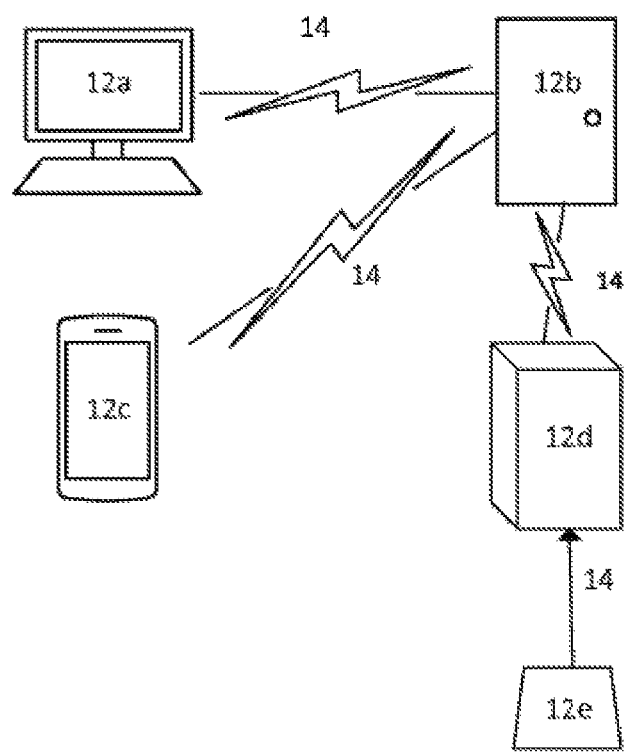
FIG. 1 is a schematic representation of a data communication system.

Embodiments will now be described with reference to the figures. It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It will also be appreciated that any module, unit, component, server, computer, computing device, mechanism, terminal or other device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Any application or module herein described may be implemented using computer readable/executable instructions that may be stored or otherwise held by such computer readable media and executed by the one or more processors.

The following relates to data communication systems and cryptographic schemes utilized in such systems; and more specifically, to optimizations and side-channel countermeasures for elliptic curve cryptography.

In general, the approach of the present embodiments taken is to (i) convert affine coordinates to projective coordinates, (ii) compute the operation in projective coordinates, and (iii) convert the result from projective coordinates to affine coordinates. In an embodiment, this approach can be used to determine scalar multiplication, in ECC schemes, and include SSCA countermeasures.

Turning to FIG. 1, an embodiment of a data communication system 10 is shown. The data communication system 10 includes a plurality of devices 12 interconnected by communication links 14. The devices 12 may be of any known type including a computer 12a, a server 12b, a cellphone 12c, ATM 12d, and smart card 12e. The communication links 14 may be conventional fixed telephone lines, wireless connections implemented between the devices 12, near field communication connections such as Bluetooth™ or other conventional forms of communication.

Figure 2:
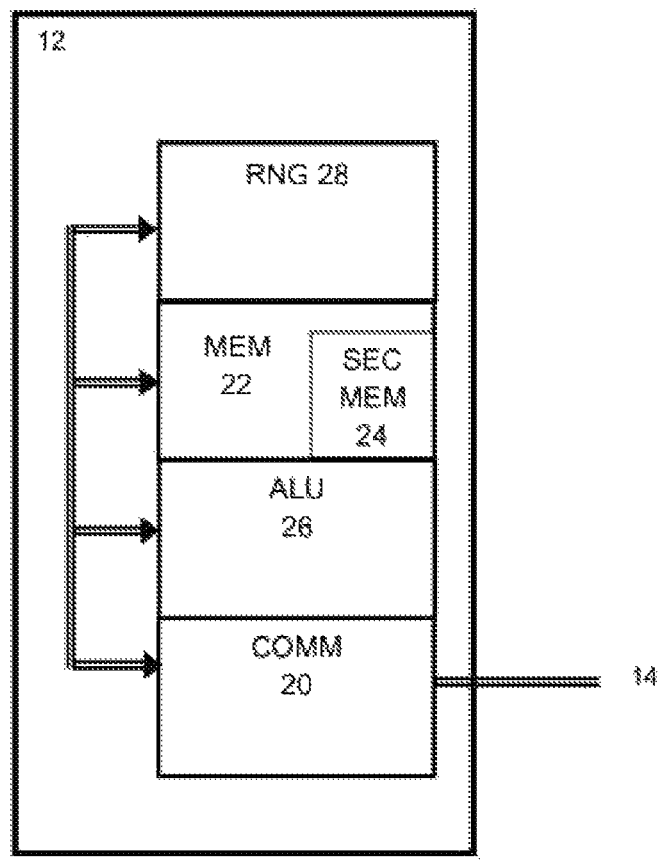
FIG. 2 is a representation of a device used in the data communication system of FIG. 1.

As shown in FIG. 2, the devices 12 will differ according to their intended purpose, but typically will include a communication module 20 for communication to the links 14. A memory 22 provides a storage medium for non-transient instructions to implement protocols and to store data as required. The instructions are executed by an arithmetic logic unit (ALU) 26 (or processing unit). A secure memory module 24, which may be part of memory 22 or may be a separate module, is used to store private information, such as the private keys used in the encryption protocols and withstand tampering with that data. The arithmetic logic unit (ALU) 26 (or processing unit) is provided to perform the arithmetic operations instruction by the memory 22 using data stored in the memories 22, 24. A random or pseudo random number generator 28 is also incorporated to generate bit strings representing random numbers in a cryptographically secure manner.

It will be appreciated that the device 12 illustrated in FIG. 2, is highly schematic and representative of a conventional device used in a data communication system.

The memory 22 stores system parameters for the ECC scheme to be implemented and a set of computer readable instructions to implement the ECC scheme. The parameters can be represented as bit strings, or any other suitable computer-readable representation.

Finite field arithmetic in $F_p$ includes operations that vary greatly in efficiency. Notably, modular inversion can be slower than the other operations by about two orders of magnitude. Conventional approaches tend to rely heavily on inversion operations if standard affine coordinates are used. In some cases, problems related to inversion operations can be alleviated by using transformations to other coordinate systems that reduce the quantity of inversions, but increase the number of modular multiplications. As described herein, Applicant has advantageously determined a system and method that selects, for each ECC operation or step, one or more coordinate transformations that lead to coordinates with an optimal inversion-to-multiplication (I/M) ratio. In an example, candidates for coordinates are the following:

Affine coordinates;
Standard projective coordinates;
Jacobian projective coordinates;
Chudnovsky projective coordinates; and
Modified Jacobian coordinates.

In further cases, such as for the point addition operation in ECC, it is also possible to perform the operation in mixed coordinates. Hence, for further optimization, mixed coordinates will be considered.

In a representative example, let $E:y^2=x^3+ax+b$ be the equation of the elliptic curve. Coordinates of this curve can be represented in the following ways:

Affine coordinates: From a curve in Weierstrass form $y^2=x^3+Ax+B$, a point $P_1$ is represented with the $x_1$ and $y_1$ coordinates: $P_1=(x_1,y_1)$;
Standard projective coordinates: A projective point (X:Y: Z), $Z\neq 0$, corresponds to the affine point (X/Z,Y/Z);
Jacobian projective coordinates: A Jacobian point (X:Y: Z), $Z\neq 0$, corresponds to the affine point $(X/Z^2,Y/Z^3)$;
Chudnovsky projective coordinates: A Chudnovsky point $(X:Y:Z:Z^2:Z^3)$ corresponds to the Jacobian point (X:Y: Z), $Z\neq 0$; and
Modified Jacobian coordinates: A Jacobian point (X:Y:Z: $aZ^4$), $Z\neq 0$, corresponds to the affine point $(X/Z^2,Y/Z^3)$.

Figure 3:
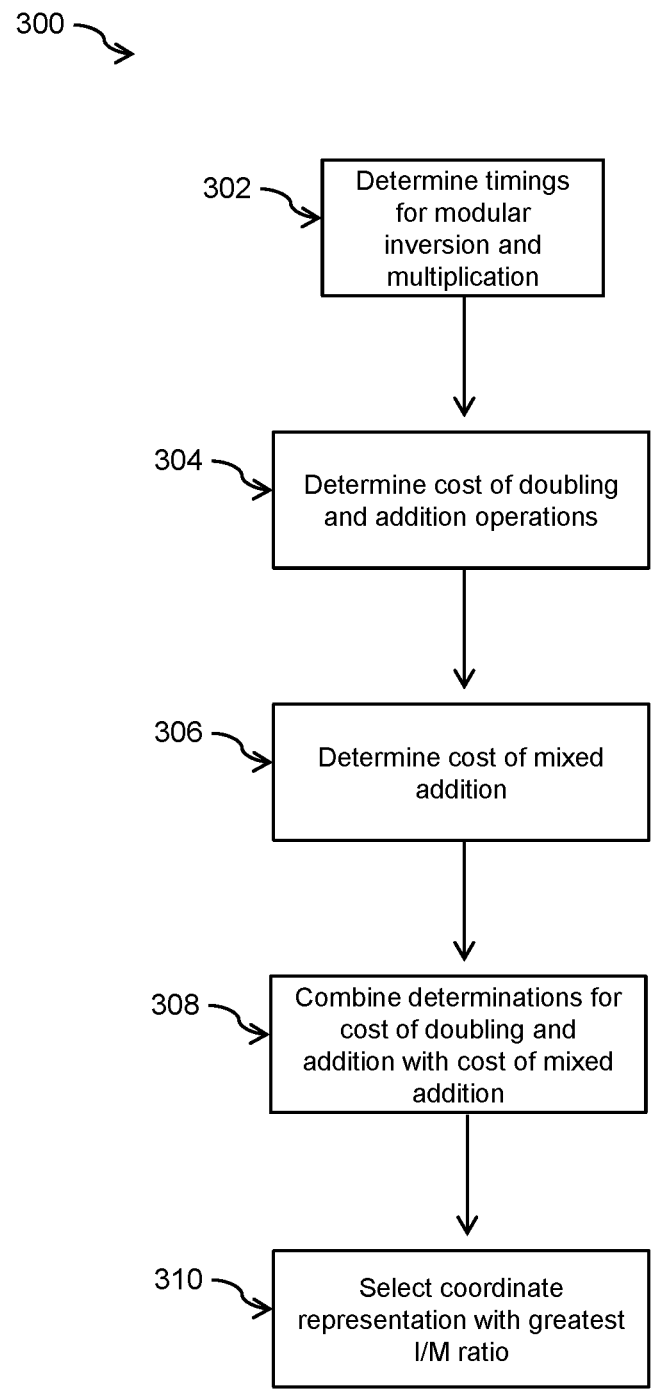
FIG. 3 is a flow chart showing a method for selecting coordinate transformations, according to an embodiment.

As shown in the flowchart of FIG. 3, there is provided a method for selecting coordinate transformations 300. At block 302, timings are determined for modular inversion and modular multiplication in $F_p$ for a target system. At block 304, for each coordinate representation, the cost of doubling and addition operations for elliptic curves is determined in terms of the underlying finite field operations. At block 306, the cost of addition operations for elliptic curves is determined in terms of finite field operations for mixed coordinate addition. At block 308, the determinations from block 304 and block 306 are combined. At block 310, the coordinate representation with the most greatest I/M ratio is selected.

In implementations of ECC schemes, a common operation to perform scalar multiplication consists of a series of doublings and additions. The operations on elliptic curve points are doubling (P→2·P) and addition (P,Q→P+Q). Thus, a most optimal coordinate representation should consider both of these two operations to evaluate and compare the results.

Field inversion is an expensive operation. For example, for some fields specified by the National Institute of Standards and Technology (NIST), implementations show that inversion cost is approximately equivalent to the cost of 80 multiplications. In some cases, this cost can be much larger; for example, in the range of 260 to 550, correlating to the bitsize of the field. Thus, in some cases, switching to other coordinate representations can save substantial computational cost.

Applicant has performed an analysis to determine which of the described approaches provides superior efficiency. In such analysis, "I" represents a field inversion operation, "M" represents a field multiplication operation, and "S" represents a field squaring operation. An example for one of the analysis is described below.

As an example, for doubling using Jacobian projective coordinates: Let $P_1=(X_1, Y_1, Z_1)$, $P_2=(X_2, Y_2, Z_2)$ and $P_3=(X_3, Y_3, Z_3)=P_1+P_2$. The procedure to compute $P_3$ is as follows:

Step 1. $U_1=X_1 \cdot Z_2^2$
Step 2. $U_2=X_2 \cdot Z_1^2$
Step 3. $S_1=Y_1 \cdot Z_2^3$
Step 4. $S_2=Y_2 \cdot Z_1^3$
Step 5. If $U_1=U_2$ and $S_1 \neq S_2$, return the identity point
Step 6. $H=U_2-U_1$
Step 7. $R=S_2-S_1$
Step 8. $X_3=R^2-H^3-2U_1 \cdot H^2$
Step 9. $Y_3=R \cdot (U_1 \cdot H^2-X_3)-S_1 \cdot H^3$
Step 10. $Z_3=H \cdot Z_1 \cdot Z_2$
Step 11. Return $P_3=(X_3, Y_3, Z_3)$ Next, the number of field operations is determined. Step 1 and 2, each take S+M. For step 3, there is already $Z_2^2$, hence only 2M is needed to compute it. Similarly, step 4 takes 2M. The next three steps are free. Step 8 needs S for $R^2$, S+M for $U_1 \cdot H^2$ and there is already $H^2$, only M for $H^3$ is needed, giving a total of 2S+2M. For step 9, since there is already $U_1 \cdot H^2$ and $H^3$, only 2M is needed. Finally, step 10 takes 2M. The total is 12M+4S.

This procedural analysis was completed by Applicant for the other various coordinate representations with respect to the cost of elliptic curve addition and doubling. Applicant's analysis can be summarized as follows:

Affine coordinates: Doubling=1I+2M+2S; Addition=1I+ 2M+1S.
Standard projective coordinates: Doubling=7M+5S; Addition=12M+2S.
Jacobian projective coordinates: Doubling=4M+6S; Addition=12M+4S.
Chudnovsky projective coordinates: Doubling=5M+6S; Addition=11M+3S.
Modified Jacobian coordinates: Doubling=4M+4S; Addition=13M+6S.

Applicant then analyzed the mixed coordinate addition. Let A stand for Affine, P for Standard projective, J for Jacobian projective, C for Chudnovsky projective, and L for Modified Jacobian. Applicant's analysis can be summarized as follows:

| Coordinates | Resulting Coordinates | Cost |
| --- | --- | --- |
| P + A | P | 9M + 2S |
| J + A | J | 8M + 3S |
| J + C | J | 11M + 3S |
| C + A | C | 8M + 3S |
| L + A | L | 9M + 5S |
| L + C | L | 12M + 5S |

Taking the fact that the number of point doublings and additions is approximately the same, when performing scalar multiplication, optimization on the value of cost of doubling+addition is needed. The following gives the cost for various point representations:

|  | Doubling | Addition | Total Cost |
|---|---|---|---|
| Affine coordinates | 1I + 2M + 2S | 1I + 2M + 1S | 2I + 4M + 3S |
| Standard projective coordinates | 7M + 5S | 12M + 2S | 19M + 7S |
| Jacobian projective coordinates | 4M + 6S | 12M + 4S | 16M + 10S |
| Chudnovsky projective coordinates | 5M + 6S | 11M + 3S | 16M + 9S |
| Modified Jacobian coordinates | 4M + 4S | 13M + 6S | 17M + 10S |

Next, combining the doubling and point addition in mixed coordinates is determined. Since one of the main computations will be scalar multiplications, it is important that whenever mixed addition is used, the result is in the coordinates in which the doubling is performed. Otherwise, extra conversions would be required between the points, which would make the approach inefficient. The costs can be summarized as follows:

| Coordinates | Resulting Coordinates | Cost of addition | Cost of doubling | Total Cost |
|---|---|---|---|---|
| P + A | P | 9M + 2S | 7M + 5S | 16M + 7S |
| J + A | J | 8M + 3S | 4M + 6S | 12M + 9S |
| J + C | J | 11M + 3S | 4M + 6S | 15M + 9S |
| C + A | C | 8M + 3S | 5M + 6S | 13M + 9S |
| L + A | L | 9M + 5S | 4M + 4S | 13M + 9S |
| L + C | L | 12M + 5S | 4M + 4S | 16M + 9S |

Observing the results, it can be seen that in comparison to J+C, C+A, L+A, L+C, the method J+A is most efficient. Thus only P+A is left to compare. P+A requires four more multiplications, but two less squarings. Squaring is a special case of multiplication, hence has a complexity of no more than multiplication. Thus, Applicant determined that J+A, with doubling in Jacobian coordinates, to be most efficient.

The fact is that there is a cost of converting between the coordinate representations. Converting from affine to any of the representations is computationally free; however, converting to affine will typically require a field inversion for each coordinate (i.e. x and/or y). It may also require one field squaring; however, the cost of this is typically negligible in comparison to inversion. Point doubling or addition in affine coordinates involves one inversion. Hence, the computation can be accomplished by (i) affine to other coordinate representation, (ii) computation in other coordinate representation, then (iii) other coordinate representation to affine. To increase efficiency, the conversion to the other representation is required when the operation involves more than one addition and/or doubling operation for the case when only one coordinate is needed. Additionally, the conversion to the other representation is required when more than addition and/or doubling operations for the case when both coordinates of the point are needed. In practice, the latter will be most common due to the fact that the most common operation is scalar multiplication, which involves, approximately, the bitsize of the prime p quantity of addition/doubling operations.

Through analysis, Applicant has determined that generally the most optimal coordinate representation to use in ECC is Jacobian, with the point addition performed using mixed coordinates. In most cases in ECC, the affine coordinates of the original point will be available, and thus, mixed point addition will be applicable. The efficiency increases are especially prevalent for the scalar multiplication operation when using a double-and-add approach. For the addition portion of the approach, the original point is added to the current state of the point. The current state of the point will naturally be in Jacobian, and the original point in affine, thus obtaining a result in Jacobian. These facts allow the double-and-add type algorithm to run naturally, giving outputs in Jacobian.

Using the Applicant's determination of using Jacobian with mixed coordinates in the addition operation, the computations cost savings can be substantial. For a non-optimized version, scalar multiplication takes about $3t/2+2$ doublings/additions; where t is the bitsize of the prime. In affine coordinates, each step involves one inversion, but takes about seven fewer multiplications than a Jacobian approach. At the end, two inversions are performed using the Jacobian. Hence, this approach saves approximately $3t/2 \cdot (I-7M)$. Due to the fact that $I>>7M$, the savings can be substantial. As will described in greater detail herein, this approach also advantageously has M=S.

Generally, simple side-channel attack countermeasures ("SSCA countermeasures"), in ECC, against simple SCAs aim to make the observable information independent of the secret scalar d. The observable information being, for example, power consumption, timing, emissions, or the like.

One of the most common SSCAs are timing attacks. In some cases, such attacks can use the timing and/or execution time of ECC operations as a side-channel to derive secret information. In further cases, SSCA attacks can use the power consumption of ECC operations over time in order to garner secret information. For example, in the standard double-and-add approach, the DOUBLE step typically takes less power than the ADD step. This fact means that, at that step, an adversary can possibly distinguish whether the secret bit is 0 or 1. The adversary can glean this information because whether the DOUBLE or the ADD operation is performed depends on that secret bit in the given round. A countermeasure against these types of SSCAs is to make the execution time and power consumption of the algorithm independent of the input.

In the embodiments described herein, there is provided an approach to performing approximately constant-time and constant-power consumption in ECC operations; particularly with respect to the fundamental elliptic curve point multiplication operation. For elliptic curve point multiplication, there are generally two cases: multiplication by the generator point and multiplication by an unknown point. The system provides a countermeasure that makes the DOUBLE and ADD operations approximately indistinguishable with respect to time and power consumption.

An approach for making the DOUBLE and ADD operations indistinguishable would be to always perform the ADD operation, even when using the DOUBLE operation would be possible. However, this approach is computational costly and not efficient with respect to performance and speed.

Advantageously, the systems and methods described herein making use of Jacobian projective coordinates for elliptic curves such that SSCA countermeasures can be provided optimized at low computational cost. Particularly, the systems and methods described herein provide a more efficient approach to obtain computational indistinguishability between the DOUBLE and the ADD operations, and provide faster computation for scalar multiplications on elliptic curves.

While the systems and methods described herein are described for Jacobian projective coordinates, it will be appreciated that the approaches described herein can be applied to other projective coordinates.

Figure 4:
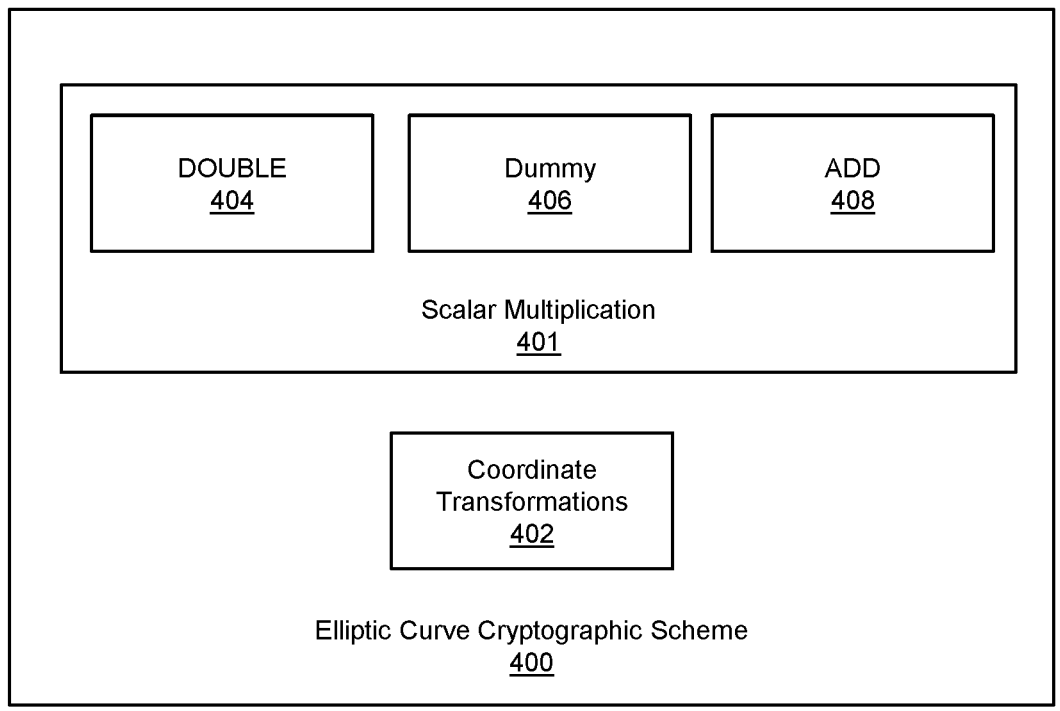
FIG. 4 is a conceptual block diagram showing an elliptic curve cryptographic scheme, according to an embodiment.

Turning to FIG. 4, a conceptual block diagram of an elliptic curve cryptographic ("ECC") scheme 400, according to an embodiment, is shown. The elliptic curve cryptographic scheme 400 permits secure communications between two or more cryptographic correspondent devices 12. Each of the cryptographic correspondent devices 12 includes at least a processor 26 and a memory 22. The memory 22 is configured to store a plurality of instructions which when executed by the processor 26 cause the processor 26 to implement the elliptic curve cryptographic scheme 400.

The elliptic curve cryptographic scheme 400 includes a constant-time scalar multiplication 401 of a point by a parameter. The elliptic curve cryptographic scheme 400 further includes coordinate transformations 402. The constant-time scalar multiplication 401 includes DOUBLE operations 404, dummy operations 406 and ADD operations 408. In a certain case, the ADD operations 408 are mixed addition operations. In a certain case, the dummy operations 406 are dummy field multiplication operations, where two random elements are from the underlying field. In further cases, the dummy operations 406 can be any dummy operation with a cost complexity equal to one operation.

In an embodiment, the elliptic curve cryptographic scheme 400 includes constant-time scalar multiplication of a point by a scalar, including transforming the point into Jacobian projective coordinates via coordinate transformation 402. The scheme 400 then includes performing iteratively to the value of the parameter either one of: doubling of the point via the DOUBLE operation 404 and multiplying any two random field elements via the dummy operation 406; or mixed addition of the point via the ADD operation 408. The scheme 400 then includes transforming the resultant of the scalar multiplication to affine coordinates via coordinate transformation 402.

Figure 5:
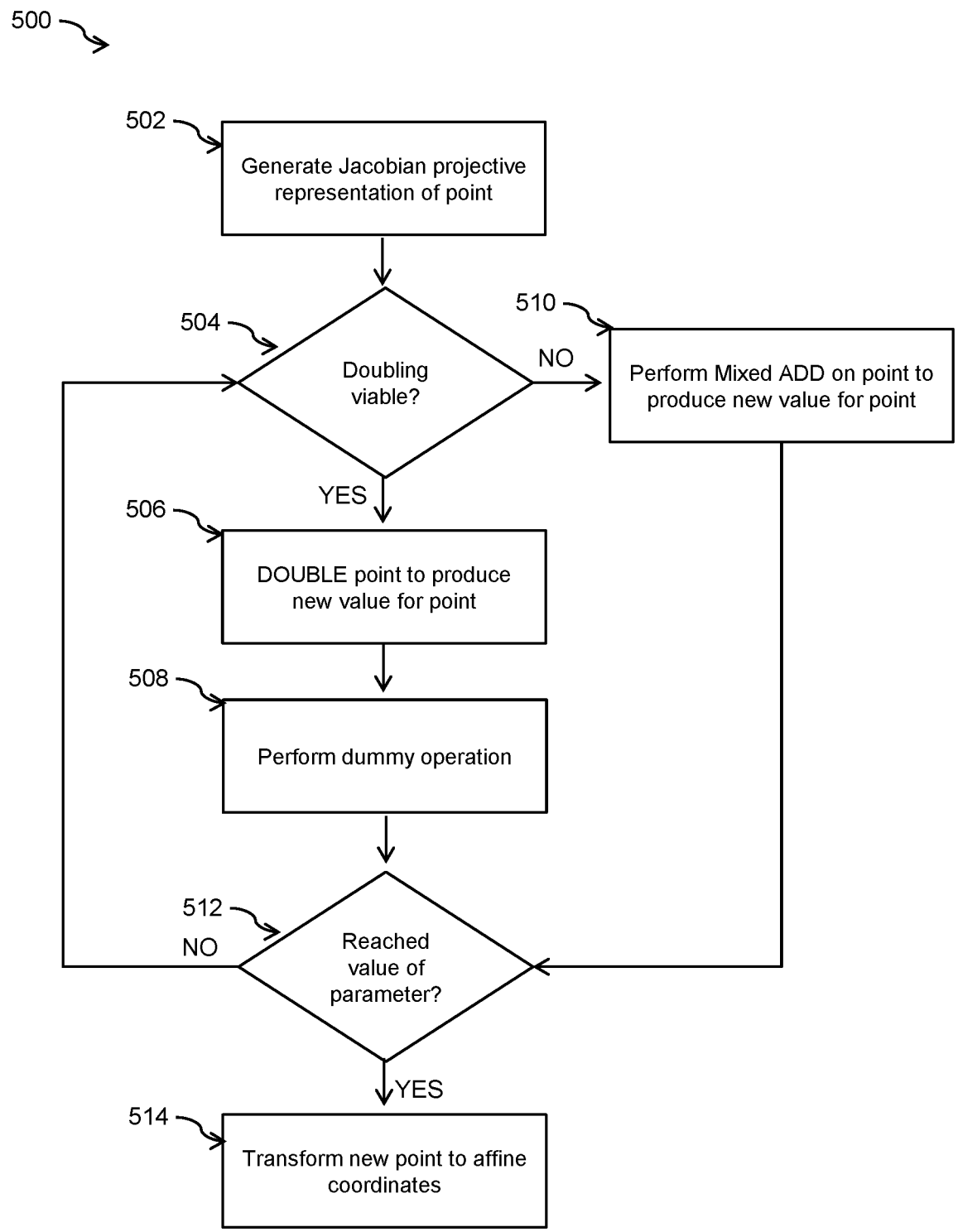
FIG. 5 is a flow chart showing a method of simple side-channel attack countermeasures for scalar multiplication of a point by a parameter in an elliptic curve cryptography scheme, according to an embodiment.

FIG. 5 is a flow chart showing, according to an embodiment, a method 500 of simple side-channel attack countermeasures for scalar multiplication of a point by a parameter in an elliptic curve cryptography scheme. The elliptic curve cryptographic scheme permits secure communications between two or more cryptographic correspondent devices 12.

At block 502, a Jacobian projective coordinate representation of the point is generated.

At block 504, there is a determination of whether doubling the point is viable. If doubling is viable, at block 506, the point is doubled to produce a new value for the point. At block 508, a dummy operation is performed by multiplying any two random field elements of the elliptic curve. If doubling the point is not viable, at block 510, mixed addition is performed on the point to produce a new value for the point.

At block 512, using the new value for the point, blocks 504 to 510 are iteratively performed to the value of the parameter, as applicable for each iteration.

At block 514, the point is transformed to affine coordinates.

In a particular case, doubling the point is viable if the value of a corresponding bit of the scalar is 0.

As described herein, mixed addition on the point includes performing addition on the value of the point at a particular iteration, in Jacobian projective coordinates, with the original value of the point, in affine coordinates, to produce the new value of the point in Jacobian projective coordinates.

In further cases, the dummy operation at block 508 can be any dummy operation with a cost complexity equal to one operation.

Figure 6:
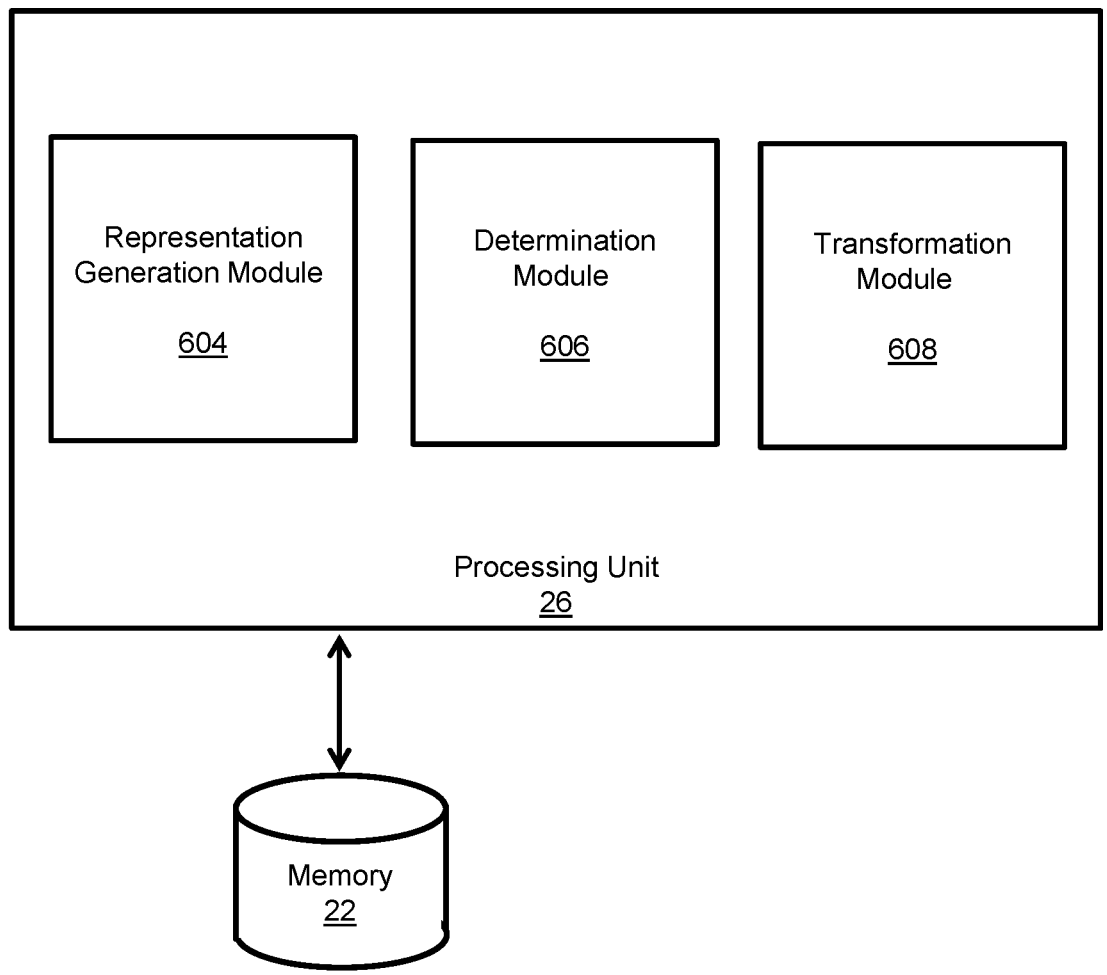
FIG. 6 is a block diagram of a system for implementing a cryptographic scheme on a correspondent device, according to an embodiment.

Turning to FIG. 6, there is provided a block diagram for a system 600 for implementing an elliptic curve cryptographic scheme on a correspondent device, according to an embodiment. The system 600 implemented on a correspondent device 12 includes the processing unit 26 and memory 22. The processing unit 26 includes a representation generation module 1304, a determination module 1306, and a transformation module 1308. The elliptic curve cryptographic scheme includes scalar multiplication of a point by a parameter.

The representation generation module 604 generates a Jacobian projective coordinate representation of the point. The determination module 606 performs iteratively to the value of the parameter, for each iteration, either one of: if doubling of the point is viable, doubling of the point to produce a new value for the point and performing a dummy operation; or if doubling of the point is not viable, performing mixed addition on the point to produce a new value for the point. The transformation module 608 transforms the point to affine coordinates.

In some cases, the dummy operation has a computational cost of one operation. In further cases, the dummy operation can include the determination module 606 multiplying two field elements in the underlying field.

In some cases the point is a generator point of the elliptic curve.

In some cases, mixed addition on the point includes the determination module 606 performing addition on the value of the point at a particular iteration, in Jacobian projective coordinates, with the original value of the point, in affine coordinates, to produce the new value of the point in Jacobian projective coordinates.

As described above, for the efficient operation on elliptic curve points, we perform doubling purely in Jacobian coordinates and addition using the mixed coordinate addition of Jacobian with affine coordinates. The cost of point doubling in this case is 4M+6S and for point addition it is 8M+3S; whereby "M" stands for field multiplication and "S" stands for field squaring. As a countermeasure for SSCA, it is advisable to have M=S to have computational indistinguishability; thus, Applicant determined that it is fortuitous that point doubling is 10M and point addition is 11M.

As stated, one of the required features for countermeasures to SSCA is to have computational indistinguishability between the DOUBLE and the ADD operations when performing scalar multiplication in ECC. Applicant advantageously determined that using Jacobian coordinates, DOUBLE and ADD operations have a close computational complexity. Accordingly, computational indistinguishability can be achieved at a very low computational cost.

According to an embodiment described herein, while performing scalar multiplication, whenever an ADD operation is required, the standard mixed addition (Jacobian and affine coordinates) is performed. Whenever a DOUBLE operation is performed, doubling, and one additional dummy field multiplication operation, is performed. In a certain case, a dummy field operation can include taking any two random field elements and multiplying them. As such, this would advantageously give the DOUBLE operation a complexity of 11M, making it the same and computational indistinguishability from the ADD operation. This approach provides a countermeasure to SSCA by obtaining constant-time scalar multiplication. This approach also advantageously prevents power analysis attack; such that a power analysis would show the same amount of power was consumed regardless of whether it was the ADD or the DOUBLE operation that was performed.

If no countermeasure were applied, roughly half of the double-and-add operations would be ADD and half would be DOUBLE. One approach to obtain computational indistinguishability as a SSCA countermeasure is to always perform the ADD operation, regardless even if the DOUBLE is available to be performed. This approach could be more than twice as expensive as an approach without a countermeasure, making the speed about 50 percent. Accordingly, the embodiments described herein for obtaining computational indistinguishability is advantageously much more efficient than this approach, and has an insignificant computational performance cost compared to this approach.

In the embodiment described herein, for the ADD operation, a mixed coordinate addition is used at cost of 11M, and for the DOUBLE operation, a pure Jacobian DOUBLE is used at cost of 10M. Hence, the average per bit of scalar multiplication cost is 10.5M. With the SSCA countermeasure of the embodiment described herein, by making the two operations indistinguishable from a timing and power analysis, makes each operation cost 11M. Hence, the average per bit of scalar cost becomes 11M. Thus, the cost of such an approach is 0.5/10.5, which is just under 5 percent. Accordingly, this means that the speed of such an approach with the SSCA countermeasure is about 95 percent of an approach without a countermeasure.

In further embodiments, applying dummy field multiplications operations can be applied to other type of projective coordinates. While the cost in other projective coordinates would generally be higher than that for Jacobian projective coordinates, using dummy field multiplications can nonetheless be more efficient than conventional techniques.

In the present embodiments, Applicant has determined that Jacobian projective coordinates are generally more efficient to use than affine coordinates. Generally, the original input is in affine coordinates and the final output is also in affine coordinates. Accordingly, there are typically conversion costs involved. Converting from affine to any of the coordinate representations, including Jacobian, is typically computationally free; however, converting from one of the coordinate representations to affine coordinates will typically require a field inversion for each coordinate, totaling two field inversions.

Nonetheless, Applicant recognized the advantages of the close computational cost of DOUBLE and mixed ADD operations in Jacobian projective coordinates. As described herein, Applicant recognized that those two operations can be made to have the same computational cost using only one dummy field multiplication. Thus, Applicant recognized the significant advantages of a computationally efficient SSCA countermeasure that provides computational indistinguishability.

Although the invention has been described with reference to certain specific embodiments, various other aspects, advantages and modifications thereof will be apparent to those skilled in the art without departing from the spirit and scope of the invention as outlined in the claims appended hereto. The entire disclosures of all references recited above are incorporated herein by reference.

We claim:

1. A method for a simple side-channel attack countermeasure for scalar multiplication of a point by a parameter in an elliptic curve cryptographic scheme, the elliptic curve cryptographic scheme permitting secure communications between two or more cryptographic correspondent devices, each of the cryptographic correspondent devices comprising a processor and a memory, the memory configured to store a plurality of instructions which when executed by the processor cause the processor to implement the cryptographic scheme, the method comprising:
   generating a Jacobian projective coordinate representation of the point;
   performing iteratively in relation to the value of the parameter, for each iteration, either one of:
      if doubling of the point is viable:
         doubling of the point to produce a new value for the point; and
         performing a dummy operation; or
      otherwise, performing mixed addition on the point to produce a new value for the point; and
   transforming the point to affine coordinates,
   wherein mixed addition on the point comprises performing addition on the value of the point at a particular iteration, in Jacobian projective coordinates, with an original value of the point, in affine coordinates, to produce the new value of the point in Jacobian projective coordinates.

2. The method of claim 1, wherein the dummy operation has a computational cost of one operation.

3. The method of claim 2, wherein the dummy operation comprises multiplying two field elements of the elliptic curve.

4. The method of claim 3, wherein the field elements are any two random field elements.

5. The method of claim 1, wherein the point is a generator point of the elliptic curve.

6. The method of claim 1, wherein doubling the point is viable if the value of a corresponding bit of a scalar is zero.

7. A system for implementing an elliptic curve cryptographic scheme on a correspondent device, the elliptic curve cryptographic scheme comprising a countermeasure resistant to a simple side-channel attack, the elliptic curve cryptographic scheme permitting secure communications between two or more cryptographic correspondent devices, each of the cryptographic correspondent devices comprising a processor and a memory, the memory configured to store a plurality of instructions which when executed by the processor cause the processor to implement the cryptographic scheme, the elliptic curve cryptographic scheme comprising scalar multiplication of a point by a parameter, the system comprising:
   a representation generation module for generating a Jacobian projective coordinate representation of the point;
   a determination module for performing iteratively in relation to the value of the parameter, for each iteration, either one of:
      if doubling of the point is viable:
         doubling of the point to produce a new value for the point; and
         performing a dummy operation; or
      otherwise, performing mixed addition on the point to produce a new value for the point; and
   a transformation module for transforming the point to affine coordinates,
   wherein mixed addition on the point comprises the determination module performing addition on the value of the point at a particular iteration, in Jacobian projective coordinates, with an original value of the point, in affine coordinates, to produce the new value of the point in Jacobian projective coordinates.

8. The system of claim 7, wherein the dummy operation has a computational cost of one operation.

9. The system of claim 8, wherein the dummy operation comprises the determination module multiplying two field elements of the elliptic curve.

10. The system of claim 9, wherein the field elements are any two random field elements.

11. The system of claim 7, wherein the point is a generator point of the elliptic curve.

12. The system of claim 7, wherein the determination module determines if doubling the point is viable by determining if the value of a corresponding bit of a scalar is zero.

* * * * *